United States Patent [19]

Stafford

[11] Patent Number: 5,056,208
[45] Date of Patent: Oct. 15, 1991

[54] METHOD FOR PROVIDING CAPTIVE PANEL FASTENER ASSEMBLY

[75] Inventor: Jay M. Stafford, Torrance, Calif.

[73] Assignee: VSI Corporation, Chantilly, Va.

[21] Appl. No.: 495,510

[22] Filed: Mar. 19, 1990

[51] Int. Cl.⁵ .................. B23P 11/00; B21D 39/00
[52] U.S. Cl. ............................. 29/515; 411/353; 411/533; 72/410
[58] Field of Search ............ 29/515, 520, 267; 10/155 R; 411/352, 353, 533, 361; 81/426.5; 72/410, 409

[56] References Cited

U.S. PATENT DOCUMENTS

| | | | |
|---|---|---|---|
| 1,230,921 | 6/1917 | Paul | 29/520 |
| 1,463,144 | 7/1923 | Carter | 29/520 |
| 1,547,162 | 7/1925 | Bohlman | 411/533 |
| 2,492,115 | 12/1949 | Crowther | 411/353 |
| 3,048,456 | 6/1962 | Dreisin | 29/520 |
| 3,987,697 | 10/1976 | Wurzel | 411/353 |
| 4,818,166 | 4/1989 | Szukay | 411/353 |
| 4,911,726 | 3/1990 | Warkentin | 411/353 |

Primary Examiner—Daniel C. Crane
Attorney, Agent, or Firm—Irving Keschner

[57] ABSTRACT

A method for forming a captive panel fastener assembly, the assembly comprising a bolt having head, shank and threaded outer end portions, slots extending longitudinally down through the bolt threads toward the outer end of the bolt and a retaining ring for securing the bolt to a panel. The metal retaining ring has inwardly tangs which are distanced sufficiently to allow the ring to be slipped over the outer end of the bolt and into the bolt slots. The ends of the slots terminate in abutments. The outer surface of the ring opposite corresponding tabs is provided with outwardly extending alignment tabs. Installation of the retaining ring onto the bolt to form the captive panel fastener is accomplished by first placing the ring alignment tabs into cutout portions formed in the nose area of a tool. The tool and ring are then engaged onto the bolt from the outer end by first aligning visual markings formed on the tool jaws with the slots. Force is then applied to the tool to crimp the ring and deform it to an oval shape while forcing the ring tangs into the slots. Since the distance between the installed ring tangs is smaller than the diameter of the slot-end abutments, the ring is prevented from being removed from the bolt slots.

13 Claims, 2 Drawing Sheets

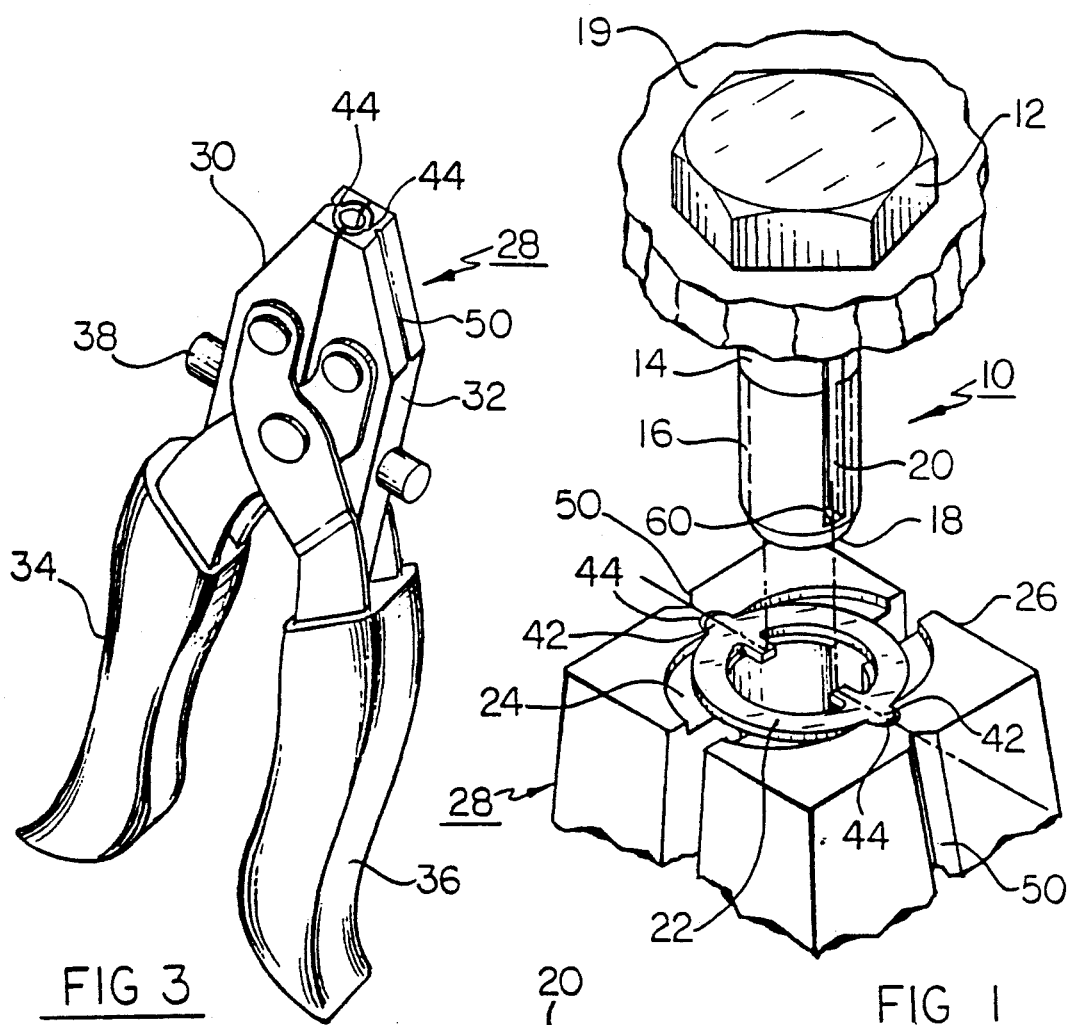

METHOD FOR PROVIDING CAPTIVE PANEL FASTENER ASSEMBLY

BACKGROUND OF THE INVENTION

1. Field of the Invention

The present invention relates to captive fastener assemblies, and more particularly, to an improved captive fastener assembly suitable for being captivated to panels such as aircraft panels and the like.

2. Description of the Prior Art

Panel fasteners for aircraft cowlings and other aircraft panels are well known in the art. In the customary means of assembly, a stud with an enlarged head is inserted through the opening of the panel and into a nut member attached to the base structure of the aircraft. The stud is then torqued to secure the panel. To prevent the stud from falling out of the panel when removed from the nut and possibly being lost, or falling into a Jet engine intake and thereby damaging the engine, the stud is usually coupled with a retaining means which captivates the stud to the panel.

Once such captivated panel fastener is shown in U.S. Pat. No. 3,294,140. As seen in this patent, the stud has an enlarged head and three splines extending intermediate its length. A retaining ring formed with integral tabs is snapped over the unsplined leading end of the stud and the tabs placed in the splines. Once in place, the retaining ring and the enlarged head of the stud function as stops to captivate the stud and prevent it from being displaced from the panel. In this embodiment, the retaining ring must be relatively flexible, and the tolerances between the tabs and the spline must be relatively loose to permit the ring to be snapped over the leading end of the stud.

Because of the flexibility of the retaining ring and the loose tolerances between the splines and the tabs, it has bee found that the stud, particularly if cocked at an angle, can become accidentally detached from the retaining ring and thus from the panel. As mentioned above, this has important consequences if the stud were to fall into the jet engine intake and damage the engine.

Other prior art techniques for installing retaining rings with inward facing tabs onto studs (screws) having longitudinal slots to accept the tabs included:

(a) Using a split retaining ring which is open sufficiently to clear a screw nose abutment and then allow to close with the tangs engaging the screw slots. This method of ring installation is prone to assembler error which would cause the ring to take a "set" in the open position resulting in disengagement from the bolt.

(b) Using a bolt having a deformable nose end allowing a solid ring to be slipped onto the bolt with the tabs engaging the slots and then deforming the nose end to create an abutment which prevents the ring from disengaging. This type of design is limited by the narrow selection of reformable bolt materials and requires a somewhat bulky installation tool needing precise adjustments to prevent over-distorting the bolt. U.S. Pat. No. 4,665,658 to Gulistan is an example of this technique. As disclosed in this patent, the threaded end of the fastener, or bolt, has a hole in it so that after the retaining ring, or washer, is applied to the bolt via the slots formed thereon, the outer end thereof is formed by a hand tool and bent outwardly to a slight extent to close the slot end and thus prevent the washer from being removed from the bolt.

(c) Using a solid ring which was pushed or "shoehorned" over the screw nose, deflecting the tabs or stretching the ring until it snapped into engagement with the bolt slots. The disadvantage of this method lies in the small amount of "springback" inherent to solid rings creating a "set" in the ring shape resulting, in many cases, in insufficient slot engagement. The device described in the aforementioned U.S. Pat. No. 3,294,140 is one example of this technique.

d) Using a knurled, press-fit plug fitted into a hole located in the bolt nose to captivate the retaining ring to the bolt's longitudinal slots. The plug contains a flange abutment which captivates the ring on the bolt.

Other techniques for captivating the bolt on the panel include those disclosed in U.S. Pat. No. 3,394,747 to Duffy Wherein the ring is screwed or pushed onto the stud threads and then crimped; U.S. Pat. Nos. 4,723,881 and 4,865,500 to Duran wherein a ring is deformed from its original shape by crimping and captivated to the outside of an internally threaded bolt by means of a secondary split ring which is installed onto the nose area of the bolt creating an abutment which prevents the primary, solid rings form falling off U.S. Pat. No. 2,949,143 to Shur wherein the ring is installed into a housing which is mounted into a panel hole, the housing, by means of a second, surrounding ring, captivating the bolt assembly to the panel and U.S. Pat. No. 2,492,115 to Crowther wherein the ring is threaded or pushed onto the bolt until it passes the bolt threads and grips an unthreaded portion of the bolt shank, the ring internal portion deforming elastically during installation over the bolt threads and then returning to its original shape to grip unthreaded shank.

U.S. Pat. Nos. 3,561,093 and RE.27,978 to Gulistan disclose push-pull tools for pulling on a bolt while pushing upwardly on a housing skirt, thereby outwardly flaring the housing which contains the bolt, the outward flaring of the housing skirt onto the base of a panel captivating the bolt assembly to the panel.

In those teohniques requiring a separate installation tool to install the ring on the bolt slots, it is difficult to visually align the tool with the bolt slots for the installation, thus increasing the installation time and the labor costs associated therewith.

What is thus desired is to provide a method for providing a captive panel fastener which utilizes a solid ring retainer, the bolt itself not being deformed during the installation process, and tooling which enables the user to rapidly align and install the ring on the bolt.

SUMMARY OF THE PRESENT INVENTION

The present invention sets forth a method for providing a captive panel fastener assembly comprising a bolt, or screw, having head, shank and threaded outer end portions, slots extending longitudinally down through the bolt threads towards the outer end of the bolt and a retaining ring for securing the bolt to a panel.

The metal retaining ring has inwardly facing tangs, or tabs, which are distanced sufficiently to allow the ring to be slipped over the outer end of the bolt and into longitudinally extending slots formed thereon. The ends of the slots terminate in abutments. The inside diameter of the installed ring is sufficiently larger than the outside diameter of the bolt shank, threads and outer end to allow the bolt to travel freely through the ring. The outer surface of the ring is provided with outwardly extending alignment tabs opposite the corresponding tangs.

Installation of the retaining ring onto the bolt is accomplished by first placing the alignment tabs into cut-out portions formed in the nose area of a tool. The tool and ring are then engaged onto the bolt from the outer end by first aligning visual markings formed on the tool jaws with the slots. Force is then applied to the tool to crimp the ring and deform it to an oval shape while forcing the ring tangs into the slots. The distance between the ring tangs, upon crimping, is smaller than the diameter of the slot-end abutments thereby preventing removal of the ring from the bolt slots. In addition, the distance between the ring tangs, upon crimping, is greater than the distance between the slot faces, and the width of the ring tangs is narrower than the width of the slots, thus enabling the ring to travel freely along the slot length. The ring retains the deformed oval shape after the installation.

The initial ring shape may be oval, the crimping process causing the ring to take a substantially round shape after installation. The ring alignment tab and the corresponding receiving component in the tool jaws can take various shapes, such as notches, flats, etc.

The present invention thus provides a relatively simple and inexpensive technique for retaining a fastener to a panel by installing a solid retaining ring onto the threaded bolt without the necessity of deforming the bolt material. Since the bolt is not deformed, should ring failure occur, the bolt may be reused by installing a new ring. In addition, selection of bolt materials, heat treatments and finishes are not limited to only deformable materials. The use of cooperating alignment features on the ring and in the tool jaws and the visual markings on the outside surfaces of the tool jaws enables the installation to be accomplished rapidly and accurately.

BRIEF DESCRIPTION OF THE DRAWING

For a better understanding of the invention as well as other objects and further features thereof reference is made to the following description which is to be read in conjunction with the accompanying drawing wherein:

FIG. 1 is a perspective view illustrating the retaining ring positioned in a tool prior to installation onto a bolt;

FIG. 2 is a perspective view illustrating the retaining ring installed on a bolt;

FIG. 3 is a perspective view of an installation tool utilized in the present invention;

FIG. 6 is an end view showing the retaining ring after the installation; and

DETAILED DESCRIPTION OF INVENTION

Figure 4:
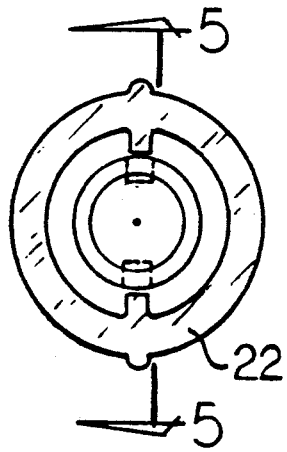
FIG. 4 is a end view showing the retaining ring during the initial stages of the installation.

Referring now to the drawings, a perspective view illustrating the initial steps of forming the captive panel fastener assembly of the present invention is illustrated. In particular, a bolt also known in the art as a stud or screw) 10, comprises a head 12, a smooth shank portion 14 adjacent head 12 and a threaded portion 16 leading from the shank portion to the forward end of the bolt 10. The bolt 10 is shown extending through panel member 19.

Extending substantially along the length of the bolt beginning adjacent the head at one end of the bolt and terminating adjacent the forward end of thereof are two slots, or splines, 20 (only one shown in FIG. 1), the slots 20 being spaced equidistant 180° ) from each other about the periphery of bolt 10.

A solid retaining ring 22 is shown positioned in an oval depression 24 formed in the front end, or nose, 26 of installation tool 28. As shown more clearly in FIG. 3, tool 28 comprises jaws 30 and 32, gripping handles 34 and 36 and jaw locking button 38. Retaining ring 22 is provided with inwardly extending tangs, or tabs 40, for engagement with splines 20 of the bolt 10. Directly opposite tangs 40 and extending outwardly ar rounded tab portions 42 positioned to fit into alignment notches 44 formed in the tool nose in depression 24. As shown in FIG. 1, retaining ring 22 in its initial round shape, is inserted into the oval depression 24 when the jaws 30 and 32 are slightly open. The dimensions of slots 20 and the tangs 40 are such that when the tangs are operatively engaged with the slots (FIG. 8), there is minimal sliding clearance between the members enabling the retaining ring to be maintained substantially perpendicular to the axis of the bolt. A pair of notches 50 are formed in tool jaws 30 and 32 in alignment with tabs 44 to enable the installer to properly align the tool nose, and thus retaining ring 22, with slots 20. To enhance the alignment process, the notches preferably, are filled with a visibility enhancing material, instead of notches 50 such as yellow marking material. Alternatively, a visible marking material could be directly applied to the tool jaws.

FIG. 2 is a perspective view illustrating tool 28 placed on stud 10 tangs 40 in slots 20 and the tool jaws 30 and 32 closed upon each other in a manner such that the circularly shaped retaining ring shown in FIG. 1 has changed to an essentially oval shape. Due to the "set" characteristics of the retaining ring material (a material which can be utilized is 17-7 precipitation hardening corrosion resistant steel), the ring retains the oval shape after the tool is removed from bolt 10.

Figure 5:
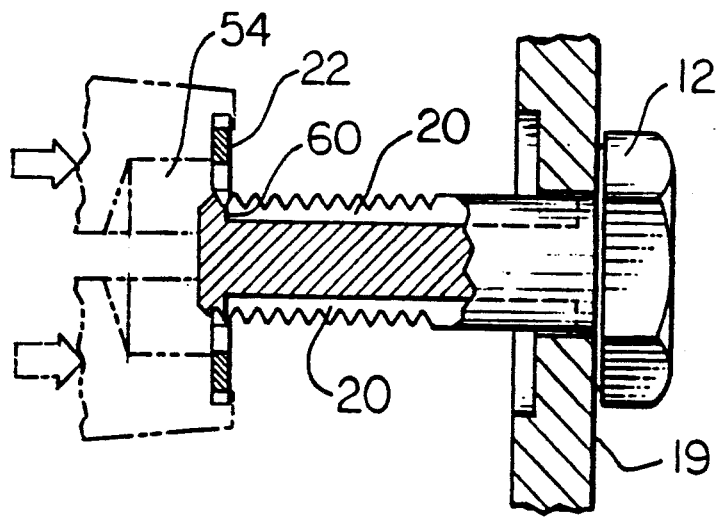
FIG. 5 is a sectional view along line 5—5 of FIG. 4.
Figure 6:
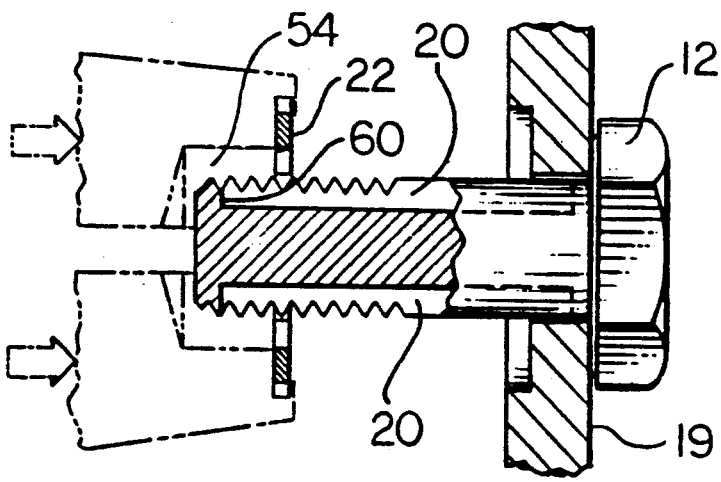
FIG. 6 is a sectional view showing the retaining ring during the intermediate state of the installation.
Figure 7:
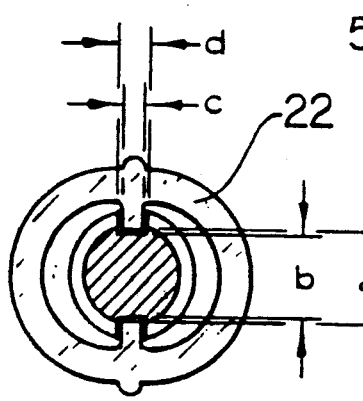
Figure 8:
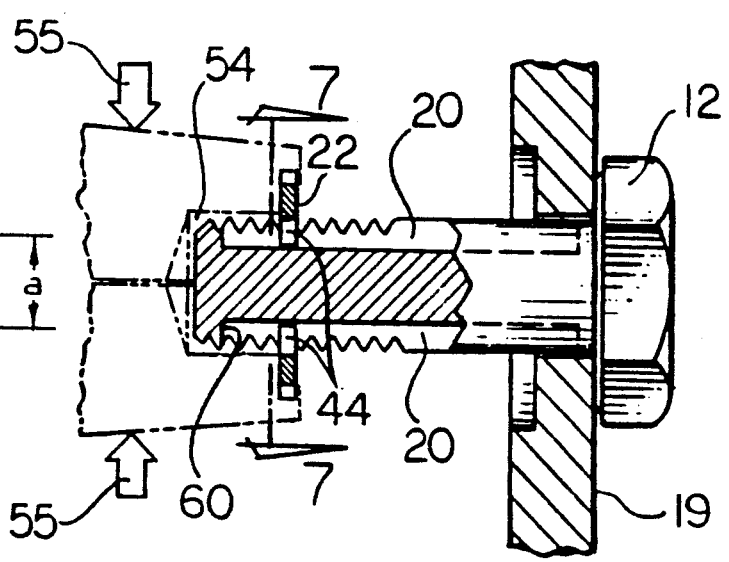
FIG. 8 is a sectional view along line 8—8 of FIG. 7.

FIGS. 4 and 5 illustrate the installation at the moment when the tool nose is initially placed on bolt 10, the internal diameter of the retaining ring 22 and the inwardly extending height of tangs 40 being such that the retaining ring clears the front end of bolt 10. As shown in FIG. 6, the tool is placed onto the bolt to a depth determined by the depth of tool jaw relief hole 54. FIGS. 7 and 8 illustrate the installation procedure after the tool jaws have been forced together as indicated by arrows 55 by the use squeezing handles 34 and 36 together. At this time, retaining ring 22 is crimped, such that it takes an oval shape, while forcing tangs 40 into slots 20 to a depth such that the tangs 40 are permanently maintained in the slots 20 by abutments 60 formed at the ends of slots 20 the abutments are shown perpendicular to the longitudinal axis of bolt 10). The distance between the ring tangs 40, upon crimping, is smaller than the diameter of the slot end abutments thereby preventing removal of the ring from the bolt slots. Since the distance a between the ring tabs, upon crimping, is greater than the distance between the slot faces b (FIG. 2) and the width c of the ring tabs is narrower than the width d of the slots, the retaining ring 22 is free to travel along the slot length.

It should be noted that other variations of the assembly shown in the figures can be utilized and still be encompassed by the teachings of the present invention. For example, retaining ring 22 could be crimped from an original oval shape ring into a substantially circularly or round) shaped ring during installation. In addition. flats can be utilized on the tool laws instead of the notches shown. Further, the outwardly extending tabs 42 could be replaced by inwardly shaped notches which then would engage correspondingly shaped notch protrusions formed in the tool nose recess.

The installation procedure is as follows.

Bolt 10 is first inserted through an aperture formed in panel 19. Retaining ring 22 is placed in the oval depression 24 formed in tool nose 26 (the tool jaws are slightly open to accept the retaining ring) in a manner such that alignment tabs 42 are positioned in corresponding tool nose cutouts or notches 44. The installation tool is positioned onto bolt 10 with the yellow markings on the tool jaws aligned with the bolt slots 20. The bolt nose protrudes into the tool jaw relief hole 54 so that the retaining ring tangs 40 clear the bolt nose. The handles of the tool are then squeezed firmly to crimp (deform) the retaining ring 22, the tool then being opened and removed from bolt 10. The installation is complete with the retaining ring 22 now substantially oval in shape and with the tangs 40 engaged in slots 20 and unable to clear abutments 60.

The present invention thus provives a captive panel fastener assembly wherein the installation of the solid retaining ring does not require deformation of the receiving bolt, thus providing an assembly wherein retention capability is enhanced and wherein installation is accomplished rapidly and simply by using a double alignment arrangement, the retaining ring first being accurately aligned in the tool nose and the tool jaws having visible alignment markings so that the installer can align the tool and thus the retaining ring) with the bolt slots.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A method for installing a retaining ring on a fastener to provide a captive panel fastener in place comprising the steps of:

providing a fastener having a head and a threaded outer end, said threaded outer end having first and second longitudinally extending slots, the end of each of said slots speaced from said fastener head having vertically extending abutment portions;

mounted said fastener in the desired captive location;

placing a continuous ring of a predetermined shape over the front end of said fastener, said retaining ring having first and second inwardly extending tang members which fit into and slide along said first and second slots, respectively, the front edge of said tang members being spaced a first distance from the bottom of said slots; and permanently deforming said retaining ring in a manner such that said tang members are spaced a second distance from the bottom of said slots, such that the tang members slide along the slots with said ring moving over said threaded outer end and the tang members contact said abutments when said retaining ring slides to the spaced end of said slots whereby said retaining ring is prevented from being removed from said fastener.

2. The method of claim 1 wherein said retaining ring is a substantially circular shaped when initially placed on said fastener.

3. The method of claim 2 wherein the deforming step includes deforming said retaining ring from said circular shape to a substantially oval shap.

4. The method of claim 1 wherein said retaining ring further comprises first and second alignment members positioned opposite said first and second tang members, respectively, and located on the outside periphery of said retaining ring.

5. A method for installing a retaining ring on a fastener to provide a captive panel fastener in place comprising the steps of:

providing a fastener having a head and a threaded outer end, said threaded outer end having first and second longitudinally extending slots, the end of each of said slots spaced from said fastener head having verically extending abutment portions;

mounting said fastener in the desired captive location;

providing a tool having first and second movable jaw members, each jaw member having a nose portion with a depression formed therein, each depression being shaped such that when the jaw members are in a first position, a retaining ring can be positioned within a depression formed by the depressions in the nose portions of said first and second jaw members, said tool having first and second gripping members connected to said first and second jaw members whereby said jaw members can be moved between said first position and a second position;

placing a retaining ring of a predetermined shape in the depression formed when said jaw members are in said first position;

placing said tool over the first end of said fastener, said retaining ring having first and second inwardly extending tang members capable of fitting into and sliding along said first and second slots, respectivley, the front edge of said tang members being initially spaced a first distance from the bottom of said slots; and deforming said retaining ring by moving said jaw members to said second position in a manner such that said tang members are spaced a second distance from the bottom of said slots, said second distance being less than said first distance, such that the tang members slide along the slots with said ring moving over said threaded outer end and the tang members contact said abutments when said retaining ring slides to the spaced end of said slots whereby said retaining ring is prevented from being removed from said fastener.

6. The method of claim 5 wherein said retaining ring is permanently deformed when said jaw members are moved to said second position.

7. The method of claim 5 wherein said retaining ring is formed as a continuous member.

8. The method of claim 5 wherein said retaining ring is substantially circular shaped when initially placed in said tool depression.

9. The method of claim 8 wherein said deforming step includes deforming said retaining ring from said circular shape to a substantially oval shape.

10. The method of claim 5 wherein said retaining ring further comprises first and second alignment members positioned opposite said first and second tang members, respectively, and located on the outside periphery of said retaining ring.

11. The method of claim 10 wherein said first and second alignment members are arranged to engage corresponding alignment cutouts formed in the nose portions of said first and second jaw members.

12. The method of claim 11 further wherein marks are formed on the side of said first and second jaw members, said marks being in alignment with the corresponding cutouts formed in the nose portions of first and second jaw members.

13. The method of claim 11 further including the step of aligning the cutouts formed in the nose portions of said first and second jaw members with said first and second longitudinally extending slots, respectively, before the tool is placed over the front end of said fastener.

* * * * *